(12) United States Patent
Feller (10) Patent No.: US 7,429,937 B2
(45) Date of Patent: Sep. 30, 2008

(54) METHOD FOR CONSTRUCTING RLL CODES OF ARBITRARY RATE

(75) Inventor: Marc Feller, Long Beach, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 11/619,364

(22) Filed: Jan. 3, 2007

(65) Prior Publication Data

US 2008/0158025 A1 Jul. 3, 2008

(51) Int. Cl.
*H03M 7/00* (2006.01)
(52) U.S. Cl. .......................................... 341/58; 341/59
(58) Field of Classification Search .................. 341/58, 341/59
See application file for complete search history.

(56) References Cited

U.S. PATENT DOCUMENTS

| 6,184,806 B1 * | 2/2001 | Patapoutian et al. .......... 341/59 |
| 6,236,340 B1 | 5/2001 | Patapoutian |
| 6,617,985 B1 * | 9/2003 | Poeppelman ................ 341/58 |
| 6,933,864 B1 | 8/2005 | Buch |

* cited by examiner

*Primary Examiner*—Howard Williams
(74) *Attorney, Agent, or Firm*—Baker Botts L.L.P.

(57) ABSTRACT

The claimed embodiments provide methods, apparatuses and systems directed to run-length limited (RLL) coding of data. In one implementation, concatenatable RLL codes with run lengths of zeroes not exceeding k are constructed for any rate N/(N+1) where $N \leq 2^{k-2}+k-1$. As code rates increase, the value of k departs from the minimum possible value more slowly than that of many other codes. Further, occurrences of k-bit run lengths occur only at the juncture of two codewords. Due to this, the codes are mostly k−1. This quality makes the codes ideal for parity bit insertion applications such as LDPC channels. The method, in one implementation, places the bit addresses of violating sequences in a table at the beginning of the codeword, and the user data, occupying the locations where the table entries are placed, are moved into the locations of the violating sequences. This is done iteratively and in a way which provides for cases in which the violating sequence is inside the address table itself.

19 Claims, 7 Drawing Sheets

1. User Data:

2. Initial Codeword:

3. First Pass:

4. Final Codeword:

FIGURE 1

1. User Data:

Fig. 2A

2. Initial Codeword:

Fig. 2B

3. First Pass:

Fig. 2C

4. Final Codeword:

1. Received Codeword:

Fig. 5A

2. First Pass:

Fig. 5B

3. Second Pass:

Fig. 5C

4. Decoded User Data:

FIGURE 7B even years. Additionally, some prior art methods
METHOD FOR CONSTRUCTING RLL CODES OF ARBITRARY RATE

TECHNICAL FIELD

The present invention relates generally to encoding and decoding of data.

BACKGROUND

In a magnetic storage channel it is desirable to limit the number of consecutive zeroes in a data stream in order to ensure frequent updates to the timing recovery system. This is called run length limitation and may be accomplished, for example, by dividing the data into "N" bit blocks, then mapping each block onto N+1 bit blocks chosen such that no N+1 bit blocks, nor pair of concatenated blocks, has more than a desired number "k" of consecutive zeroes. Typical codes include those replacing each block of eight bits with a run-length-limited ("RLL") block of nine bits ("8/9 code"), as well as "16/17", "24/25"; "32/33"; and others. The ratio N/(N+1) is called the "rate" of the code. Of course, RLL schemes with different coding rates also exist.

A disadvantage of many prior art methods is that they are defined by look-up tables, so that encoding and decoding complexity, together with cost and power consumption, increase exponentially with code length. Another disadvantage is that most prior art methods are ad hoc, requiring a different approach to develop a code for each rate. Some prior art methods can be efficiently encoded and decoded using sequential logic thus partially addressing the complexity problem. However, these prior art methods often require considerable ingenuity to adapt them to a given rate and rates exist for which no code can be constructed using them. This is a concern because as recording technology moves away from byte-oriented error correction (such as Reed-Solomon codes) to soft-decoding methods (such as Turbo and low density parity check ("LDPC") codes), RLL codes with a variety of rates will be required. Additionally, some prior art methods for constructing long codes have been devised which involve interleaving un-encoded blocks with blocks from a shorter, RLL-encoded word. While general in some sense, these techniques often give rise to severely sub-optimal values of k.

In view of the foregoing, a need exists in the art for a general method for the construction of RLL codes which employs efficient encoders and decoders; produces codes with near-optimal values of k; and easily adapts to any desired code rate.

SUMMARY

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

The claimed embodiments provide methods, apparatuses and systems directed to run-length limited (RLL) coding of data. In one implementation, concatenatable RLL codes with run lengths of zeroes not exceeding k are constructed for any rate N/(N+1) where $N \leq 2^{k-2}+k-1$. As code rates increase, the value of k departs from the minimum possible value more slowly than that of many other codes. Further, occurrences of k-bit run lengths occur only at the juncture of two codewords. Due to this, the codes are mostly k−1. This quality makes the codes ideal for parity bit insertion applications such as LDPC channels. The method, in one implementation, places the bit addresses of violating sequences in a table at the beginning of the codeword, and the user data, occupying the locations where the table entries are placed, are moved into the locations of the violating sequences. This is done iteratively and in a way which provides for cases in which the violating sequence is inside the address table itself.

In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Figure 1:
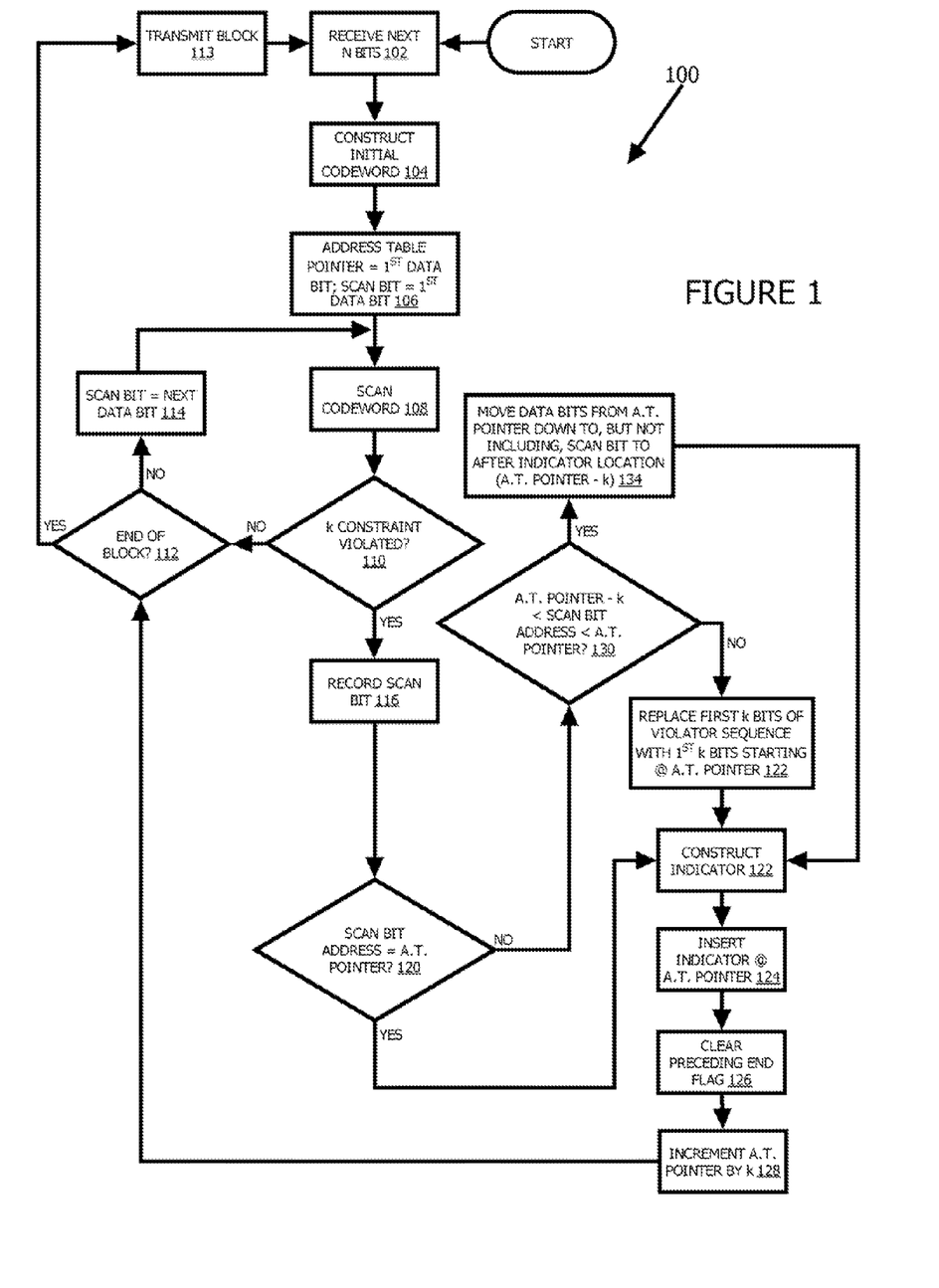
FIG. 1 is a flowchart diagram illustrating a method for encoding a codeword of data to be written to a medium, in accordance with an example embodiment.

FIG. 1 is a flowchart diagram illustrating a method 100 for encoding a codeword of data to be written to a medium, in accordance with an example embodiment. Method 100 can be implemented by a controller of a media device, which scans code words for strings of zeroes that violate a coding constraint (k), and replaces violating sequences with an indicator that meets the coding constraint. The method includes pre-pending a 1 bit at the beginning of each code word. If there are no violating strings of zeroes of a length k in the codeword, then no additional modifications are performed to the codeword. If the controller finds a violating string of zeroes of a length k in the codeword, the controller changes the pre-pended bit to 0 and inserts a 1 (guard bit), k−2 bits designating the address of the violation, followed by a 1 (end flag). The controller also replaces the violating string-of-zeroes with the data that was previously in the first k bits of the word. The controller then iterates, treating a final 1 in the first replacement in a similar manner as that of the pre-pended bit in the first pass.

An exception can occur during the above-noted replacement operation in that if the address of the violator equals the value of the address table pointer, no bits are moved, and if the address of the violator is less than the address table pointer but greater than the address table pointer plus k, then only the bits from the address table pointer down to, but not including, the leftmost violator bit are moved. This exception handles "inside" violators which will be described in a subsequent section.

Initially, the controller receives N bits (102), constructs an initial codeword by pre-pending a 1 bit (104) and sets an address table pointer ("A.T. pointer") equal to a first data bit address (106). Restated, a scan bit address is set equal to a first data bit address. Next, the controller scans the codeword (108) and determines if a k constraint has been violated (110). If no, the controller determines if an end of the codeword block has been reached (112). If yes, the controller transmits the block (113) and receives the next N bits (102). Otherwise, the controller sets the scan bit address equal to the next data bit address (114).

If the k constraint is violated (110), the controller records a scan bit address (116), and determines if the scan bit address is equal to the address table pointer (120). The controller does the determination at operation 120 in order to ascertain if alternate processing is necessary due to a type of violator that has been encountered—an outside violator or an inside violator. More specifically, operation 120 determines if alternate processing is necessary for a specific occurrence of an inside violator. A detailed description of the two types of violators will be provided at a subsequent section.

If the scan bit address equals the address table pointer (120), the controller constructs an indicator (122), inserts the indicator at the address table pointers (124), clears a preceding end flag (126) and increments the address table pointer by k (128). Next, the controller performs operation 112.

If the scan bit address does not equal the address table pointer (120), the controller determines if the scan bit address is less than the address table pointer and greater than the address table pointer minus k (130). If no, the controller replaces the first k bits of the violator sequence with the first k bits starting at the address table pointer (132). Next, the controller executes operations 122-128 as previously described.

If operation 130 is affirmative, the controller moves data bits from the address table pointer down to, but not including, the scan bit address to after the indicator location (address table pointer—k) (134). Next, the controller executes operations 122-128. Operation 130 also determines if alternate processing is required due to an occurrence of an inside violator.

This encoding method 100 of FIG. 1 provides for a run length not exceeding k, because the sequences of k bits that can occur will be of the last k−1 bits of one block and the prepended bit of the following block when the following block was transformed to eliminate violators. The guard bits ensure that no indicator can give rise to additional violations and the exception of operation 120 (scan bit address=address table pointer so no bits are moved) ensures that data bits which need to be moved from the address table cannot increase the number or length of violators. Addresses of violators also cannot give rise to additional violations because even if addresses are all zeroes, they are enclosed within either a pair of guard bits, which are always 1, or a guard bit and an end flag with the value 1. Additionally, since any combination of bits that includes a data pattern and a k-bit violator, whether that violator is external or internal, is replaced with the same number of bits. Due to this, sufficient space, in a codeword, is maintained for indicators independent of a number of violators in the initial data word.

In one implementation, if $N>2^{k-2}$ then offset bit addresses are utilized. The offset bit addresses only address the first $2^{k-2}$ bits of a codeword as a violator can not be present in the remaining $N-2^{k-2}$ bits. For example, if N=21 and k=6, the last 5 bits will not be addressed by the offset bit addresses as a violator of k (6) zeroes can not occur at those last 5 bits. When $N>2^{k-2}$, indicators are constructed with address fields that point to offset bit addresses. Alternatively stated, the scan bit address recorded at operation 116 is decreased by $N-2^{k-2}$ before it is placed into an indicator.

It should be appreciated that given the construction of a maximum-length code, that is, with $N=2^{k-2}+k-1$, it is possible to delete bits from the right-hand end of each user data block so as to produce a shorter code, that is, one with any smaller value of N. Due to this, method 100 produces codes for all rates N/(N+1) essentially without modification.

Figure 2A:
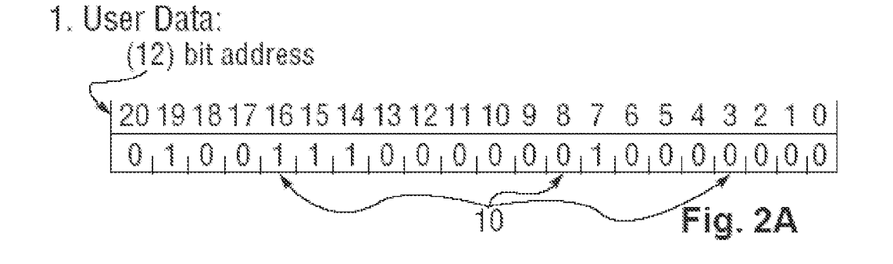
FIGS. 2A-2D sequentially illustrate an example of data being encoded, in accordance with an example embodiment.
Figure 2B:
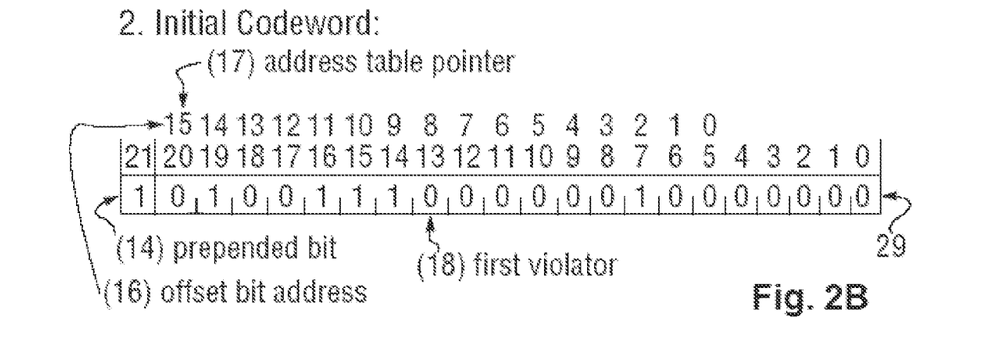

FIGS. 2A-2D sequentially illustrate an example of data being encoded, in accordance with an example embodiment. In this example, the code run rate is 21/22 and k (RLL constraint) has been set at 6. 20 bits of data 10 are received and each bit has a corresponding bit address 12 (FIG. 2A). An additional bit 14, with a value of 1, is then pre-pended to the received bits to form an initial codeword 29. If the codeword 29 does not contain any sequences of k contiguous zeroes (violators) then it is transmitted unchanged. Each bit has a corresponding bit address. Additionally, bit addresses #5-20 have a corresponding offset bit address 16. In the encoding example of FIGS. 2A-2D, $N>2^{k-2}$ so offset bit addresses are utilized. An address table pointer 17 is created which initially points to a bit address of a bit immediately adjacent to the pre-pended bit 14. In the example of FIG. 2B, the address table pointer 17 initially points to offset bit address #15.

Figure 2C:
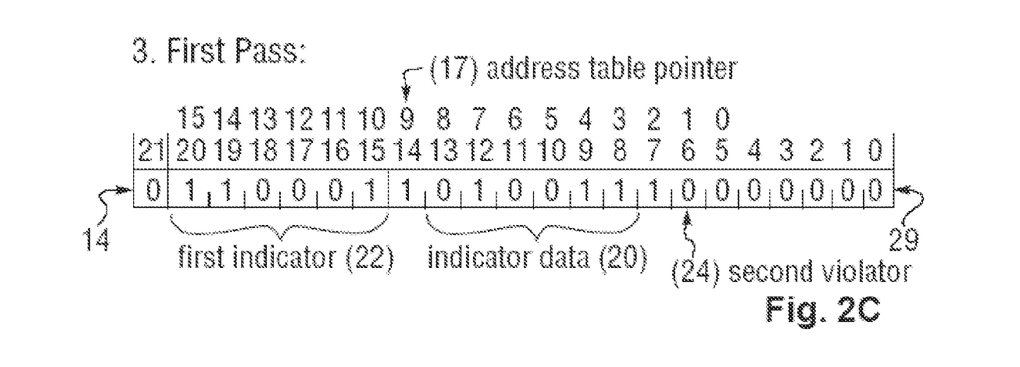

The codeword 29 is then scanned, left to right, using a sliding window of k bits starting at offset bit address #15. When a violator 18 is offset detected, a bit address of a first bit address of the violator is recorded. In the example of FIG. 2B, the first bit address of the violator 18 is bit address #8 as a sequence of k (6) zeroes begins there. When the first violator is detected, pre-pended bit 14 is changed to 0. The k bits of the violator 18 are then replaced with k bits of the codeword 29 starting from the offset bit address that is being pointed to by the address table pointer 17. Referring to FIGS. 2B-2C, the sequence "0 1 0 0 1 1" which begins at offset bit address #15 is moved to the location of the violator 18 and that transferred data is referred to as indicator data 20.

Next an indicator sequence 22 of k bits is constructed and placed in the codeword 29 starting at the offset bit address pointed to by the address table pointer (FIG. 28). Indicators, in one implementation, begin with a guard flag whose value is one, an address field, of length k−2, that identifies a first offset bit address of a violator and an end flag with an initial value of 1. If an additional violator is detected, the end flag is changed to a 0. Referring to FIG. 2C, first indicator 22 includes the guard flag at offset bit address #15, the address field at offset bit addresses #14-11 and the end flag at offset bit address #10. The address field of the first indicator 22 contains the sequence "1 0 0 0" which refers to offset bit address #8.

Figure 2D:
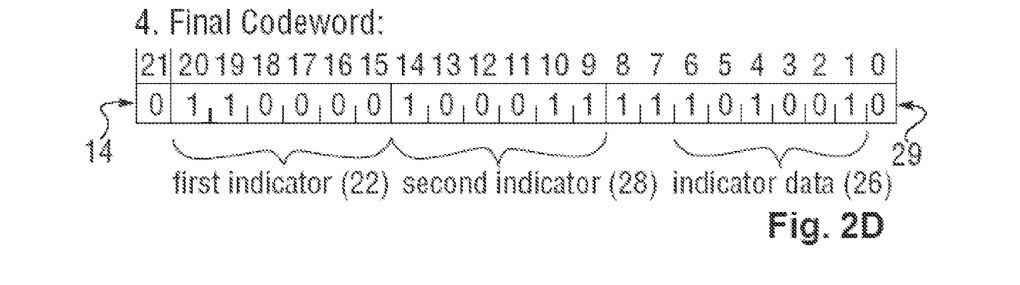

From FIG. 2B to FIG. 2C, the address table pointer 16 is advanced by k such that it now points to offset bit address #9 in FIG. 2C. Also in FIG. 2C, the codeword 29 is further scanned and a second violator 24 is detected whose first bit is addressed by offset bit address #6 which is recorded. Referring to FIG. 2D, the end flag of the first indicator 22, at offset bit address #10 is changed from 1 to 0 and bits of the second violator 24 are replaced with k bits starting from the offset bit address pointed to by the address table pointer in FIG. 2C. Specifically, k bits ("1 01 0 0 1") starting from offset bit address #9 (refer to FIG. 2C) and are placed into the bits occupied the second violator—bit addresses #1-6 wherein bit addresses #5-6 correspond to offset bit addresses #0-1. Those replaced bits are referred to as indicator data 26.

Referring to FIG. 2D, a second indicator 28 is then constructed with a guard flag at offset bit address #9 whose value is 1, an address field at offset bit addresses #5-8 and an end flag whose value is 1. The address field, at offset bit addresses #5-8, contains the string "0 0 0 1" which refers to offset bit address #1. As the second violator 24 extends into bits not addressed by the offset bit addresses 17, scanning of the codeword 29 for further violators is discontinued. If the offset bit addresses 17 were not utilized in the encoding example of FIGS. 2A-2D then scanning of the codeword 29 for violators would continue until an end of the codeword 29 is reached.

Figure 3A:
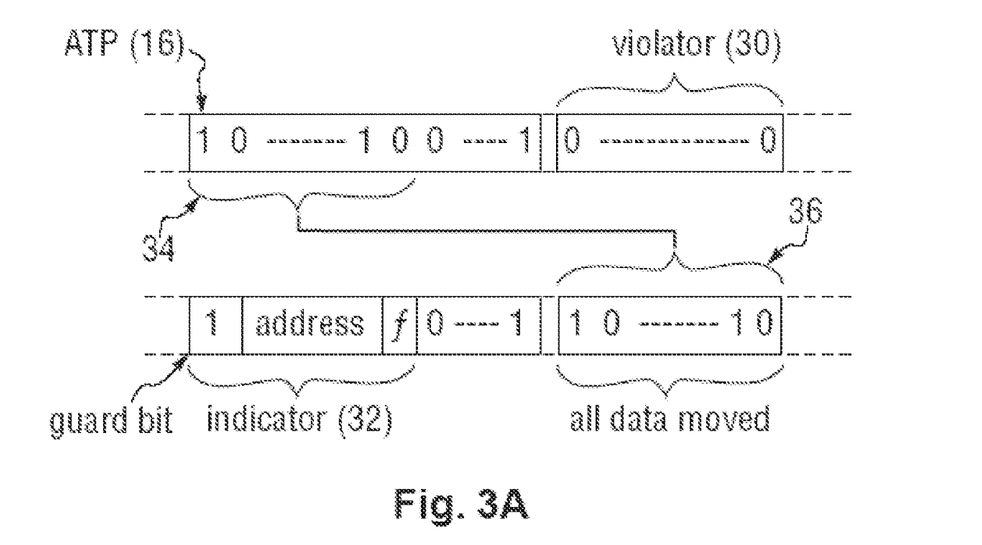
FIGS. 3A-3B illustrate external and internal violators, in accordance with an example embodiment.
Figure 3B:
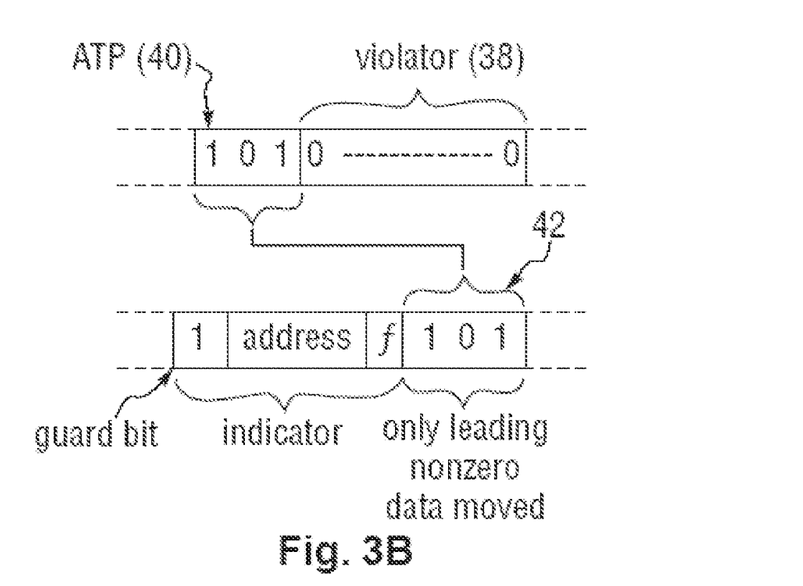

The claimed embodiments take into account two types of violators—external and internal which are illustrated in FIGS. 3A-3B, respectively. An external violator is a violator which does not begin within the location where the indicator referring to it is to be placed. An example of an external violator is external violator 30. Additional examples of external violators are violators 18 and 24 shown in FIGS. 28-2C. Similar to what was previously described, bits 34, starting from a bit address pointed to by an address table pointer ("ATP" 35, are moved to bit addresses 36 that were occupied by the external violator 30. Next, indicator 32 is constructed and placed at bit addresses starting from a bit address pointed to by the address table pointer 35.

Referring to FIG. 3B, an internal violator is a violator which begins within the location where the indicator referring to it is to be placed. For example, internal violator 38 is only a few bit addresses away from address table pointer 40. If k=6, for example, an indicator for violator 38 would be 6 bits long and would be written at bit addresses of the internal violator 38. In this instance, only the leading non-zero data 42 is moved to fill in a portion of the bits occupied by the internal violator 38.

Figure 4:
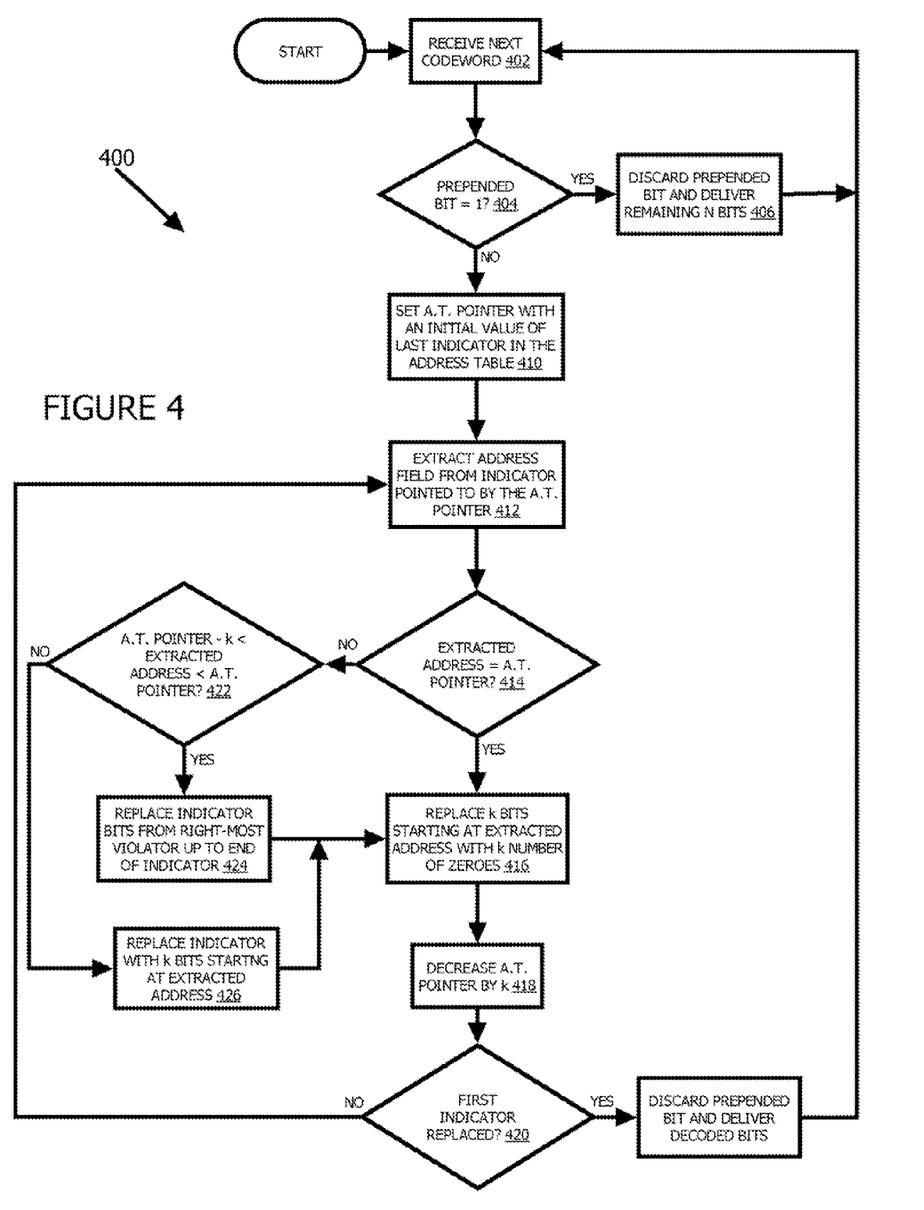
FIG. 4 is a flowchart diagram illustrating a method for decoding a codeword of data read from a medium, in accordance with an example embodiment.

FIG. 4 is a flowchart diagram illustrating a method 400 for decoding a codeword of data read from a medium, in accordance with an example embodiment. In the implementation shown, method 400 involves a controller of a media device examining a pre-pended bit of a codeword. If the pre-pended bit has a value of 1, the pre-pended bit is discarded and the remaining bits are delivered unchanged. Otherwise, the decoding of the codeword proceeds by creating an address table pointer with the initial value of the last indicator in the address table, which is that entry with an end flag equal to 1. Next, the controller extracts the address field from the indicator pointed to by the address table pointer and increasing it by $N-2^{k-2}$, if necessary, so that a violator is addressed. Next, the controller replaces the indicator with the k bits at the addressed violator. In turn, the controller replaces the k bits of the addressed violator with zeroes, decreases the address table pointer by k and repeats the extracting operation, the two replacing operations and decreasing operation until the first indicator has been replaced.

An exception can sometimes occur for the first replacing operation in that if the value of the address table pointer equals the address of the violator, no bits are moved, and if the address of the violator is less than the address table pointer but greater than the address table pointer plus k then only the bits from the rightmost violator bit up to, but not including, the end of the indicator are moved.

To explain method 400 in more detail, reference to FIG. 4 is made. First, the controller receives the next codeword (402) and determines if the pre-pended bit is equal to 1 (404). If yes, the controller discards the pre-pended bit and delivers the remaining N bits of the codeword (406). Otherwise, the controller sets an address table pointer equal to an initial value of a last indicator in the address table (410) and extracts an address field from an indicator pointed to by the address table pointer (412). Next, the controller determines if the extracted address is equal to the address table pointer (414). If yes, the controller replaces k bits starting at the extracted address with k number of zeroes (416) and decreases the address table pointer by k (418). In turn, the controller determines if the first indicator has been replaced. If yes, the controller receives the next codeword (402).

If the extracted address does not equal the address table pointer (414), the controller then determines if the extracted address is less than the address table pointer but greater than the address table pointer minus k (422). If yes, the controller replaces indicator bits from a right-most violator up to an end of the indicator (424). Otherwise, the controller replaces the indicator with k bits starting at the extracted address (426).

Due to bit errors in a channel, the received codeword may be malformed. Restated, the received codeword fails to conform to the structure of a properly-encoded codeword as previously described. One detectable malformation is any guard bit equal to 0. Others are the occurrence of an indicator with an address smaller than that of the indicator itself or than the address of any preceding indicator. A decoder may optionally detect these malformations and report an un-decodable codeword.

Figure 5A:
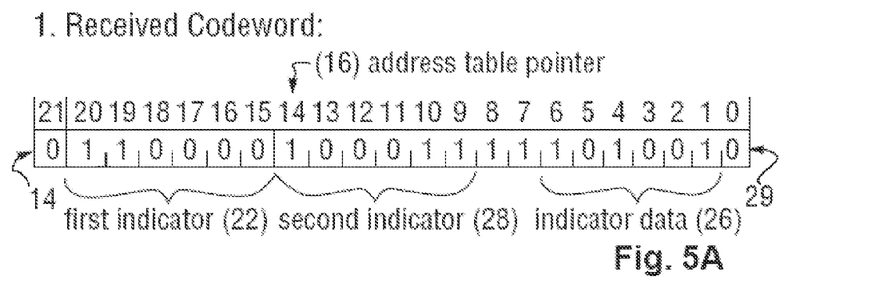
FIGS. 5A-5D sequentially illustrate an example decoding of a codeword, in accordance with an example embodiment.

FIGS. 5A-5D sequentially illustrate an example decoding of a codeword, in accordance with an example embodiment. In this example, the code rate N/(N+1) is 21/22 and k has been arbitrarily set at 6. The received codeword 29 of FIG. 5A is the same codeword that was constructed in the encoding example of FIGS. 2A-2D and includes prepended bit 14, first and second indicators 22 and 28 and indicator data 26. The prepended bit 14 has a value of 0 and decoding of codeword 29 is therefore necessary. Address table pointer 16 is set at a first bit address of a lastly-encoded indicator. Specifically, address table pointer 16 is set to point at bit address #14 of the second indicator 28. The lastly-encoded/second indicator 28 is located based on the value of the end flag. Second indicator 28 has an end flag at bit address #9 and its value is 1 which indicates that no further violators were detected after the second indicator was constructed.

Figure 5B:
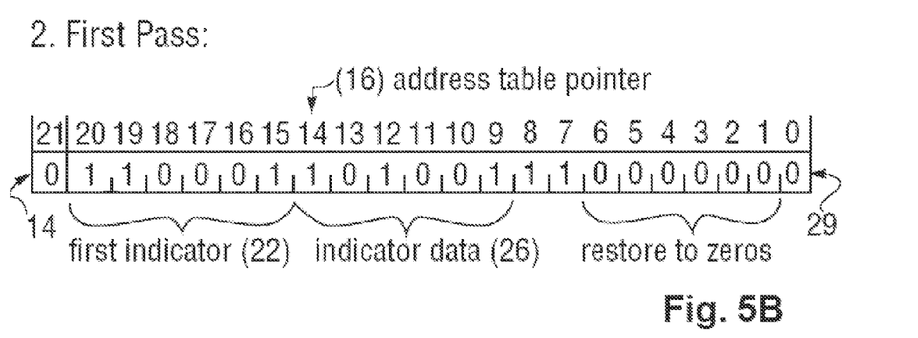

An address is extracted from second indicator 28 and the extracted address is increased by $N-2^{k-2}$ since $N>2^{k-2}$. The extracted address points to bit address #1 which in turn is increased to bit address #6 which is the bit address of a first bit of the indicator data 26. Referring to FIG. 5B, bits occupied by the indicator data 26 are restored to zeroes and the indicator data 26 is moved to bits starting from a bit address that is pointed to by the address table pointer 16.

Figure 5C:
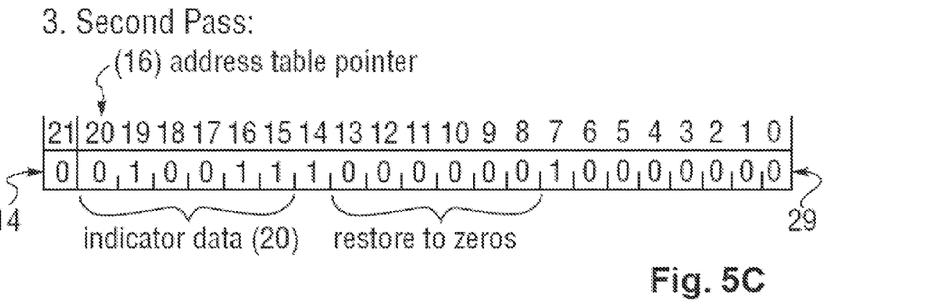
Figure 5D:
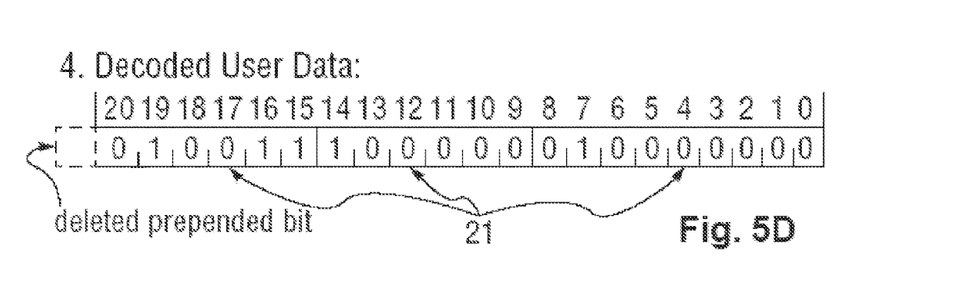

Referring to FIG. 5C, the address table pointer 16 is decreased by k so that it points to bit address #20 of first indicator 22. An address is extracted from an address field, of first indicator 22 (as shown in FIG. 5B before being replaced by indicator data 22) and that address points to bit address #8 which is increased to bit address #13. k bits starting at bit address #13 are therefore restored to zeroes and indicator data 20 from bit addresses #13-8 as shown in FIG. 5B are placed at bit addresses #20-15 as shown in FIG. 5C. Next, in FIG. 5D, prepended bit 14 is deleted which results in the original 21 bits of data 10 that was initially shown in FIG. 2A.

Figure 6A:
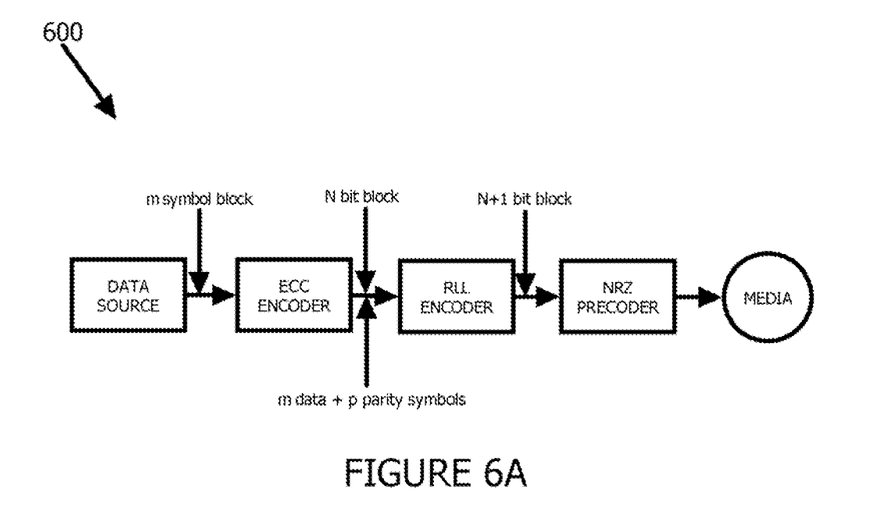
FIGS. 6A-6B are block diagrams illustrating a decision channel, implemented in hardware, for a write section (FIG. 6A) and a read section (FIG. 6B), in accordance with an exemplary embodiment.
Figure 6B:
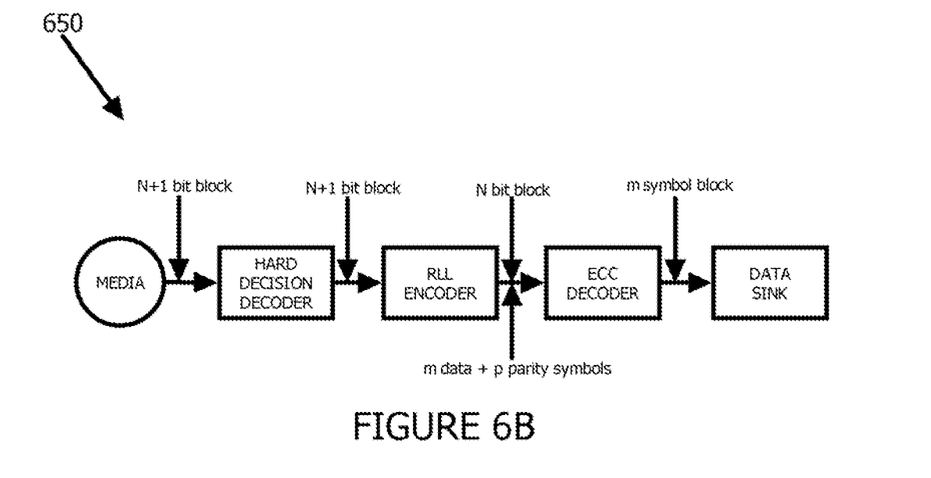

FIGS. 6A-6B are block diagrams illustrating a decision channel, implemented in hardware, for a write section 600 and a read section 650, in accordance with an exemplary embodiment, FIGS. 6A-6B illustrate that RLL encoding and decoding is "outside" an error correction mechanism.

Restated, for writing, the data is ECC encoded before being RLL encoded. And, for reading, the RLL encoding is removed before error correction takes place. This is possible because a hard-decision detector, typically employing a Viterbi algorithm, is used, the output of which is a stream of determinate bits which can be treated by an RLL decoder.

Figure 7A:
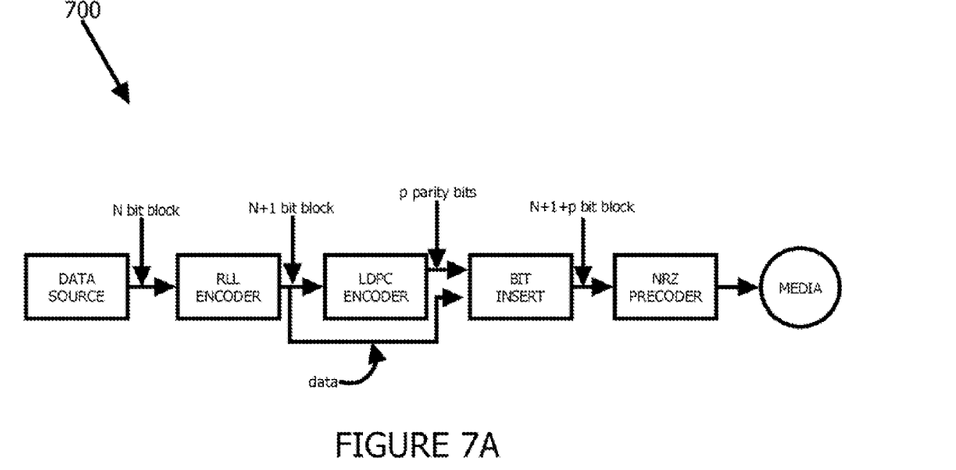
FIGS. 7A-7B are block diagrams illustrating a soft-decision channel, implemented in software, for write section (FIG. 7A) and a read section (FIG. 7B), in accordance with an exemplary embodiment.
Figure 7B:
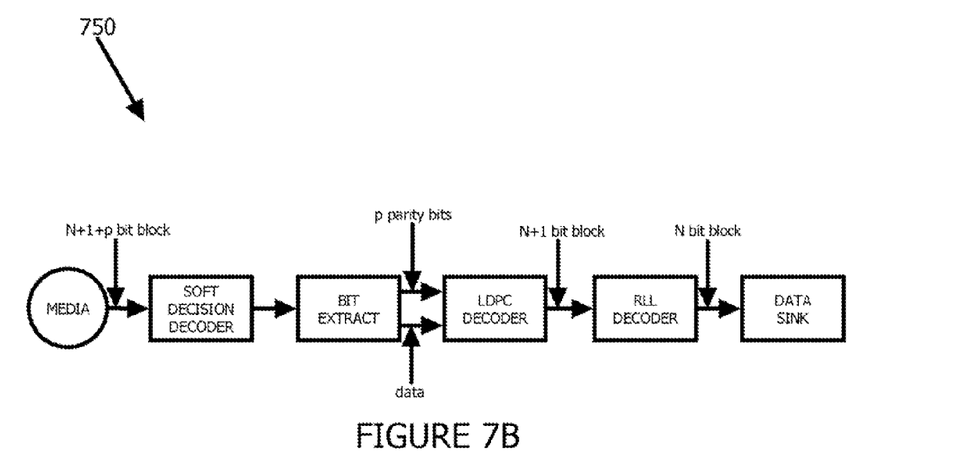

FIGS. 7A-7B are block diagrams illustrating a soft-decision channel, implemented in software, for write section 700 and a read section 750, in accordance with an exemplary embodiment. In this case, a soft-decision detector is used (which may be BCJR, SOVA, or other type), of which the outputs are not determinate bits, but probabilities. The error-control block, typically a turbo decoder or low-density parity check (LDPC) decoder, operates on these probabilities to produce the determinate output bits. Hence the RLL decoder does not operate on the detector output, but instead on the output of the error control block. Consequently, the RLL encoding and decoding is "inside" the error correction mechanism as shown.

The claimed embodiments are efficient in comparison to the prior art due to reasons described in the following section. Any user data block of length N has $2^N$ possible values, and in order for these to be mapped onto a codeword of length k, the codeword should have at least that many different values. For each codeword length N+1 and for each value of k it is possible to calculate the number of codewords which (1) contain no all-zero sequences of length greater than k, and (2) which begin and end with all-zero sequences for which the sum of the lengths does not exceed k. Such codewords may be freely concatenated without violating the k constraint, The minimum value of k for which the codeword has at least $2^N$ values is the optimum value of k for that codeword length. An RLL code is deemed efficient if its k value is near the optimum value.

RLL codes constructed in accordance with the claimed embodiments are efficient in that sense. Table I compares the values of k achieved by the claimed embodiments to the optimal values of k for the maximum number of user bits which can be encoded, that is, N. It can be seen that the achieved values diverge slowly from the optimal values as code length increases.

TABLE I

| $N_{max}$ | $k_{invention}$ | $k_{optimum}$ |
|---|---|---|
| 2 | 2 | 2 |
| 4 | 3 | 2 |
| 7 | 4 | 3 |
| 12 | 5 | 4 |
| 21 | 6 | 4 |
| 38 | 7 | 5 |
| 71 | 8 | 6 |
| 136 | 9 | 6 |
| 265 | 10 | 7 |
| 522 | 11 | 8 |
| 1035 | 12 | 9 |

Further, since the only runs of k zeroes that can occur in a codeword are, as noted above, at the conjunction of two codewords, the elimination of k bit violators in all other locations makes the stream of codewords "almost" k−1. Hence the average performance of these codes is even closer to optimum.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a media device operable to encode and decode codewords of data, a method for encoding codewords of data to be written to a medium, the method comprising:
   receiving a word comprising N bits of data;
   pre-pending an additional bit to the word to form a codeword, wherein each bit has a corresponding bit address;
   locating a violating sequence in the codeword, wherein locating the violating sequence comprises:
     pointing an address table pointer to a bit address adjacent to the pre-pended additional bit;
     scanning the codeword for the violating sequence, wherein the violating sequence comprises a contiguous sequence of bits that violate a run-length limited coding constraint k, wherein $N \leq 2^{k-2}+k-1$; and
     locating a starting bit address of the violating sequence;
   inserting, responsive to locating a violating sequence, an indicator into the codeword, wherein inserting the indicator comprises:
     replacing k bits of the violating sequence with k bits of the codeword starting from the bit address of address table pointer;
     constructing the indicator to include the starting bit address of the violating sequence; and
     inserting the indicator starting at the bit address of the address table pointer; and
   advancing the address table pointer, by k, to point to a new bit address of the code word.

2. The method as recited in claim 1 wherein the violating sequence is a contiguous sequence of bits having predetermined values.

3. The method as recited in claim 2 wherein the violating sequence is a contiguous sequence of zeroes.

4. The method as recited in claim 1 wherein a value of the pre-pended bit is changed when the violating sequence is located.

5. The method as recited in claim 1 wherein the indicator comprises a guard bit, an address field and an end flag.

6. The method as recited in claim 5 wherein the address field is k−2 bits long.

7. The method as recited in claim 5 wherein the address field identifies a first bit address of the violating sequence.

8. The method as recited in claim 5 wherein the guard bit has a value of 1 and the end flag initially has a value of 0 and wherein the end flag is changed to a 1 if an additional violating sequence is detected.

9. The method as recited in claim 1 wherein if a bit address of a first bit of the violating sequence is equal to a corresponding address table pointer then the bits of the violating sequence are replaced with the indicator.

10. The method as recited in claim 1 wherein if
   a) a bit address of a first bit of the violating sequence is not equal to a corresponding address table pointer; and
   b) if the bit address is less than the corresponding address table pointer; and
   c) if the bit address is greater than the corresponding address table pointer minus k then:
     replacing bits of the violating sequence with bits starting from the address table pointer down to, but not including, the bit address of the first bit of the violating sequence wherein the replaced bits of the violating sequence are replaced starting at one bit address adjacent to the address table pointer+k.

11. The method as recited in claim 1 wherein bit addresses of the code word range from a most significant bit address of N−1 to a least significant bit address of 0, and wherein if N>$2^{k-2}$ then the bit addresses are offset to range from the most significant bit address of N−(k+1) to a bit address of 0 where the k−1 least significant bits have no bit address.

12. In a media device operable to encode and decode codewords of data, a method for decoding codewords of data to be written to a medium, the method comprising:
   receiving a codeword comprising N bits of data, wherein N≦$2^{k-2}$+k−1, where k is a run-length limited coding constraint;
   identifying a last indicator sequence in the codeword wherein the indicator sequence comprises a bit address of a violating sequence;
   responsive to identifying the last indicator sequence, setting an address table pointer to a first bit address of the indicator sequence;
   extracting the bit address of the violating sequence from the indicator sequence;
   wherein if: a) the extracted bit address is not equal to the address table pointer; and b) if the extracted bit address is less than the corresponding address table pointer; and c) if the bit address is greater than the corresponding address table pointer minus k, then: replacing bits of the indicator sequence with bits of the violator sequence from a right-most violating sequence up to an end of the indicator sequence;
   wherein if the extracted bit address of the violating sequence equals the address table pointer, then replacing the indicator sequence with the violating sequence;
   else,
       replacing the indicator sequence with the first k bits of the code word starting at the extracted bit address;
       inserting the violating sequence into the codeword at the extracted bit address.

13. The method as recited in claim 12 wherein the violating sequence is k zeroes.

14. The method as recited in claim 12 wherein the codeword further comprises a pre-pended bit and wherein a value of the pre-pended bit is utilized to determine if the codeword includes an indicator sequence and requires decoding.

15. The method as recited in claim 14 wherein determining if the word requires decoding comprises:
   examining the pre-pended bit; and
   decoding the codeword if the pre-pended bit equals 0.

16. The method as recited in claim 12 where the indicator sequence further comprises a guard bit and an end flag.

17. The method as recited in claim 16 wherein the indicator sequence is a lastly encoded indicator sequence which is located in the codeword by a value of an end flag in the lastly-encoded indicator sequence.

18. The method as recited in claim 17 wherein the value of the end flag in the lastly encoded indicator sequence is 1.

19. The method as recited in claim 12 wherein if N>$2^{k-2}$ then the extracted bit address is increased by N−$2^{k-}$.

* * * * *